United States Patent [19]

Yamada et al.

[11] Patent Number: 5,714,729
[45] Date of Patent: Feb. 3, 1998

[54] TIG WELDING METHOD AND WELDING TORCH THEREFOR

[75] Inventors: Yuji Yamada, Ayase; Tohru Ishikawa, Yokohama; Yuichi Motora, Tokyo; Yoichi Masuda, Zama; Toshihiro Yasuda, Yokohama, all of Japan

[73] Assignee: Kabushiki Kaisha Toshiba, Kanagawa-Ken, Japan

[21] Appl. No.: 672,926

[22] Filed: Jun. 28, 1996

[30] Foreign Application Priority Data

Jun. 30, 1995 [JP] Japan ................. 7-165001

[51] Int. Cl.⁶ .................................. B23K 9/67
[52] U.S. Cl. ................ 219/75; 219/136; 219/137 R
[58] Field of Search .................. 219/75, 136, 74, 219/137 R

[56] References Cited

U.S. PATENT DOCUMENTS

| | | | |
|---|---|---|---|
| 2,798,145 | 7/1957 | Vogel | 219/75 |
| 2,799,769 | 7/1957 | Vogel | 219/75 |
| 2,922,024 | 1/1960 | Cresswell | 219/75 |
| 3,575,568 | 4/1971 | Tateno | 219/75 |
| 3,649,805 | 3/1972 | Rohrberg | 219/75 |
| 3,692,973 | 9/1972 | Oku et al. | |
| 3,950,629 | 4/1976 | Auzary et al. | |
| 4,680,440 | 7/1987 | Barlet | 219/75 |
| 5,373,139 | 12/1994 | Burgoon et al. | |

FOREIGN PATENT DOCUMENTS

| | | |
|---|---|---|
| 3701 212 A1 | 10/1972 | Germany. |
| 52-122238 | 10/1977 | Japan. |
| 57-81970 | 5/1982 | Japan. |
| 1476321 | 6/1977 | United Kingdom. |
| 2016986 | 10/1979 | United Kingdom. |

*Primary Examiner*—Clifford C. Shaw
*Attorney, Agent, or Firm*—Finnegan, Henderson, Farabow, Garrett & Dunner, L.L.P.

[57] ABSTRACT

A TIG welding method is usually carried out in a manner that a tungsten electrode is inserted into a weld groove portion of a member to be welded, an electric voltage is applied to a current conducting portion provided for the tungsten electrode while flowing a shield gas means to thereby generate an arc between the tungsten electrode and the member to be welded to form a molten pool of the member, a welding wire is inserted into the molten pool, and a welding torch is then operated to perform a welding process. In the improvement of the TIG welding method, the shield gas means is composed of an inner shield gas flowing from a periphery of the tungsten electrode to a front end thereof inserted into the weld groove portion of the member to be welded and an outer shield gas flowing towards the weld groove angle from an outside of the inner shield gas to prevent the molten pool from being oxidized and to prevent oxygen in air from being involved. The TIG welding torch for carrying out the method is specifically provided with the inner and outer shield gas flow means, and further provided with a central shield gas flow means.

22 Claims, 8 Drawing Sheets

TIG WELDING METHOD AND WELDING TORCH THEREFOR

BACKGROUND OF THE INVENTION

The present invention relates to a TIG (tig) welding method for carrying out an arc welding to a narrow weld groove portion or gap requiring small amount of welding and also relates to a TIG welding torch for the TIG welding method.

In a conventional art, there is practically known a tungsten inert gas welding, so called TIG welding, method utilizing argon gas, helium gas or their mixture gas by means of a tungsten electrode.

One of such conventional TIG welding methods will be explained hereunder with reference to FIG. 8.

Figure 8:
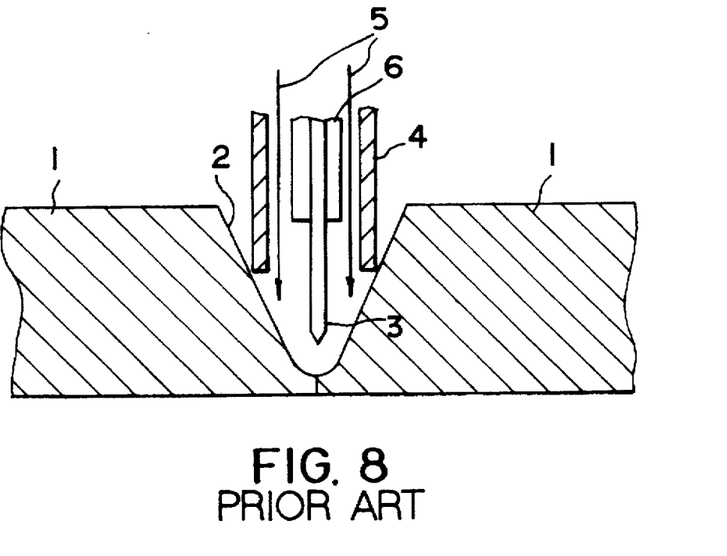
FIG. 8 is a schematic elevational section representing one example of a conventional TIG welding method.

Referring to FIG. 8, a tungsten electrode 3 is inserted into a weld groove portion 2 between members 1, 1 to be welded, a shield gas 5 is flown from an inside of an external shield 4 disposed so as to surround the electrode 3, an electric voltage is applied to a current conducting portion 6 provided for the electrode 3 to thereby generate a welding arc between the members 1, 1 to be welded and the electrode 3 to form a molten pool of the molten member, not shown, and a welding wire is inserted into the molten pool. The TIG welding method shown in FIG. 8 is performed in the above order.

In the TIG welding method, the tungsten electrode 3 is disposed so as to extend in a short length such as by about 10 mm to prevent the molten pool from being oxidized by involving oxygen in air at the welding time and to prevent the tungsten electrode from being consumed by the involved oxygen in air.

Figure 9:
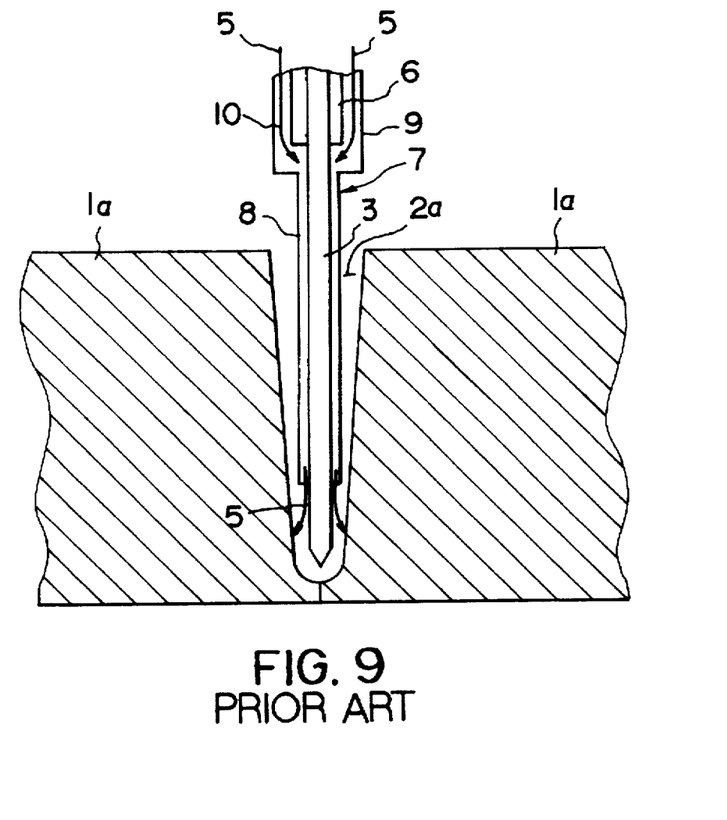
FIG. 9 is a schematic elevational section representing another example of a conventional TIG welding method.

FIG. 9 shows another example of the conventional TIG welding method in which members 1a, 1a to be welded in shape of plates having a relatively large thickness are welded by the TIG welding method. Referring to FIG. 9, an electrode portion of a welding torch 7 is inserted into a weld groove portion or gap 2a and the welding is performed in a manner mentioned with reference to FIG. 9. Generally, in order to reduce a welding time or minimize a welding deformation, it is attempted to make small a width of the weld groove portion 2a, but in a case where such method is not applicable, the welding torch 7 having a specific structure which can be inserted into the narrow weld groove portion 2a is prepared.

That is, as shown in FIG. 9, the welding torch 7 has a structure such that a flat cylindrical shield 8 for passing a shield gas 5 is disposed so as to surround the outer periphery of the tungsten electrode 3, a current conducting portion 6 adapted to apply electric voltage to the tungsten electrode 3 is provided with a cooling water passage, and a collet body 9 for holding the current conducting portion 6 is provided with a shield gas passage 10.

However, the conventional two examples of the welding torches mentioned above provide the following problems or defects.

According to the structures of these two examples of the welding torches, since the shield gas flows through only one portion, it is difficult to effectively prevent the molten pool from being oxidized. Furthermore, it is impossible to extend the length of the tungsten electrode 3 by more than 20 mm. Accordingly, in a case where a plate member to be welded having relatively large thickness is welded, as shown in FIG. 9, it will be required to prepare a welding torch having a structure such that the narrow weld groove angle 2a has an opening width of more than 30 mm, for example, or a transverse width of about 8 mm.

Furthermore, in the welding torch 7 shown in FIG. 9, the welding torch 7 having a flat shape adapted to insert it into the narrow weld groove portion 2a, but it is necessary to make it larger than the outer diameter of the tungsten electrode 3. Thus, the welding torch 7 of such structure is limited to be used for a weld groove portion of gap having a limited width.

Still furthermore, when the members to be welded having deep groove portion are welded, the shield gas achieves its function effectively, but as the welding process proceeds and the depth of the weld groove portion is made shallow, the shield gas cannot sufficiently prevent the shield gas from involving the oxygen in air, resulting in the oxidation of the molten pool.

SUMMARY OF THE INVENTION

An object of the present invention is to substantially eliminates defects or drawbacks encountered in the prior art described above and to provide a TIG welding method and a TIG welding torch carrying out the welding method capable of ensuring an improved welding to a plate like member having a narrow weld groove portion to be welded without using a welding torch having a complicated structure and involving oxygen in the air.

This and other objects can be achieved according to one aspect of the present invention by providing a TIG welding method in which a tungsten electrode is inserted into a weld groove portion of a member to be welded, an electric voltage is applied to a current conducting portion provided for the tungsten electrode while flowing a shield gas means to thereby generate an arc between the tungsten electrode and the member to be welded to form a molten pool of the member, a welding wire is inserted into the molten pool, and a welding torch is then operated to perform a welding process, the welding method having an improvement in which the shield gas means is composed of an inner shield gas flowing from a periphery of the tungsten electrode to a front end thereof inserted into the weld groove portion of the member to be welded and an outer shield gas flowing towards the weld groove portion from an outside of the inner shield gas to prevent the molten pool from being oxidized and to prevent oxygen in air from being involved.

Preferred embodiments of the welding method further provide the following features.

The shield gas means further includes a central shield gas flowing from a space between the tungsten electrode and the current conducting portion further inside the inner shield gas flow.

The tungsten electrode is composed of a tungsten material containing thorium oxide or lanthanum oxide.

The front end of the tungsten electrode is inserted into the weld groove portion of the member to be welded by a length of about 20 to 100 mm, and the inner, outer and central shield gases are composed of an argon gas containing hydrogen gas of 2 to 10 vol % or containing helium gas of 10 to 80 vol %.

In another aspect of the present invention, there is provided a TIG welding torch for carrying out a TIG welding method comprising:

a collet holder;

a collet body mounted in the collet holder;

a cylindrical current conducting member mounted in the collet body;

a tungsten electrode axially penetrating the cylindrical current conducting member;

an outer shell mounted to an outside surface of the collet holder;

an outer shield disposed outside the outer shell;

an inner shield holder disposed inside the outer shell;

an inner shield mounted to the inner shield holder;

an outer shield gas supply means mounted to the outer shield;

an inner shield gas supply means for supplying an inner shield gas to a portion between the inner shield and the collet holder; and a cooling water supply means for passing a cooling water through a portion between the collet body and the collet holder.

The welding torch further comprises a central shield gas passage formed between the tungsten electrode and the current conducting portion and a central shield disposed between the collet body and the inner shield.

In a preferred embodiment of the welding torch, the current conducting member is provided with a slit extending an axial direction thereof, and the inner shield is formed with a throttle portion at a front end portion thereof.

According to the TIG welding method of the present invention of the characters described above, the inner shield gas is surely supplied to the front end portion of the tungsten electrode inserted into the weld angle portion of the member to be welded to thereby effectively prevent the consumption of the electrode. The supply of the outer shield gas prevents oxygen in air from being involved, thus preventing oxidation of the molten pool of the member.

The consumption of the electrode can be further prevented by flowing the central shield gas inside the inner shield gas flow.

The consumption of the electrode due to the arc heat and oxidation can be suppressed by constituting the electrode with tungsten material containing thorium oxide or lanthanum oxide in place of pure tungsten material, resulting in less exchanging of the electrode with new one.

Although the length of the tungsten electrode extending into the weld groove portion is desired to be within 20 to 100 mm, this is made in consideration of the thickness of the member to be welded and the depth of the weld groove portion as well as welding quality, and in a case where the weld groove portions are formed in both sides of the member to be welded, the welding method will be applicable to a member having a plate thickness of 200 mm. The arc energy is made high and the welding depth becomes deep by adding hydrogen into the argon gas as a shield gas, but below 2 vol % of the hydrogen, no substantial effect is not expected and over 10 vol % thereof, there is a fear of explosion. In the case of adding helium gas, no effective generation of the welding arc will be expected in the case of over 80 vol % content.

Furthermore, the effect for shielding the tungsten electrode can be further improved by providing the central shield gas passage to thereby further suppress the consumption of the electrode.

According to the TIG welding torch preferably utilized for the welding method mentioned above, the front end portion of the tungsten electrode can be inserted into a predetermined position in the weld groove portion of the member to be welded, and the inner and outer shield gas supply means are disposed to thereby surely feed the inner and outer shield gas in the weld groove portion, thus effectively suppressing the consumption of the electrode. This effect can be further improved by providing the central shield gas supply means.

The formation of the slit to the current conducting portion improves the effective contact thereof to the tungsten electrode, and the formation of the throttle portion to the front end of the inner shield makes sure the flow of the inner shield gas to the front end portion of the electrode, thus preventing the consumption of the electrode.

The nature and further characteristic features of the present invention will be made more clear from the following descriptions made with reference to the accompanying drawings.

DESCRIPTION OF THE PREFERRED EMBODIMENTS

A first embodiment of a TIG welding method according to the present invention will be described hereunder with reference to FIG. 1.

Figure 1:
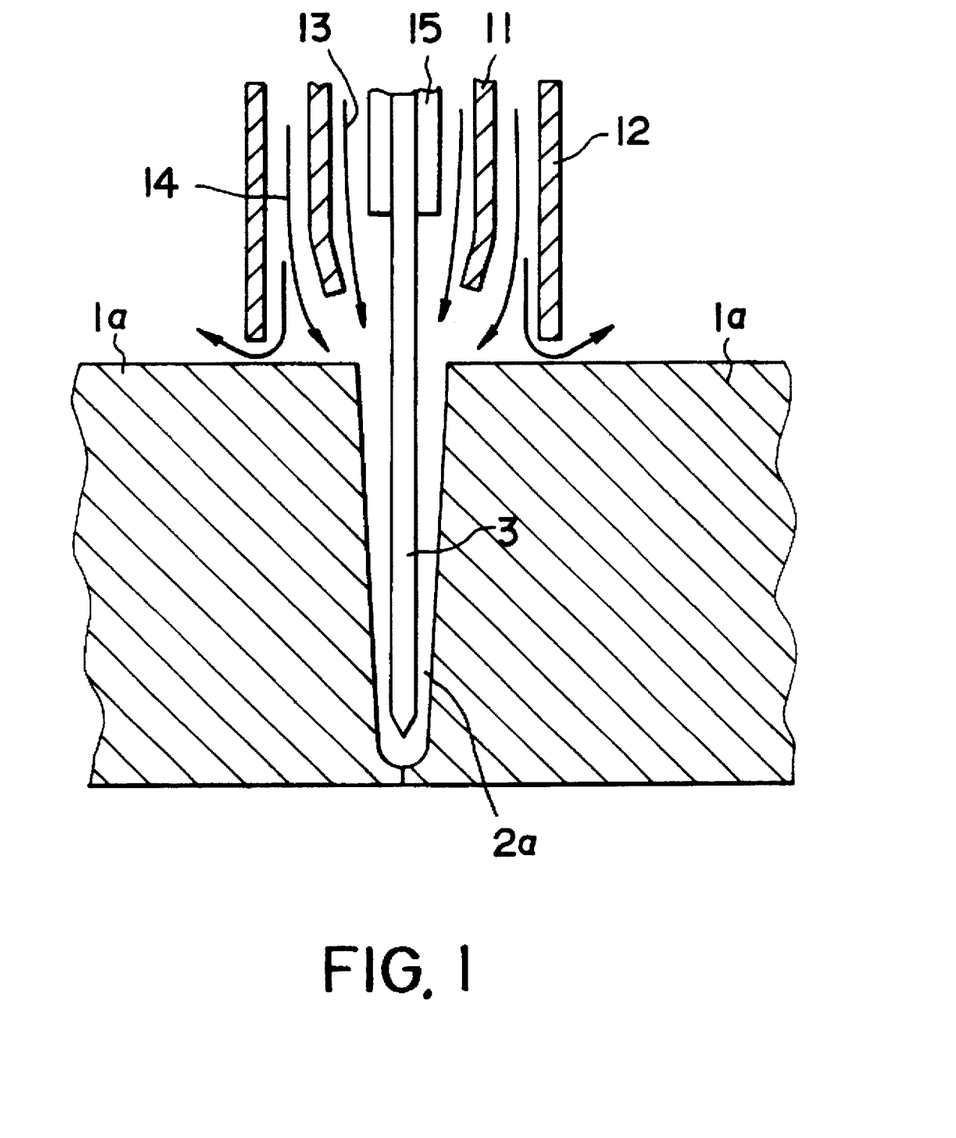
FIG. 1 is a schematic elevational section representing a first embodiment of a TIG welding method according to the present invention.

Referring to FIG. 1, a tungsten electrode 3 is inserted into a narrow weld groove portion or gap 2a formed between members 1a, 1a to be welded, as a base metal, and an inner shield 11 and an outer shield 12 are concentrically disposed so as to surround the upper portion of the tungsten electrode 3 positioned above the narrow weld groove portion 2a.

In an operation, an inner shield gas 13 is supplied to flow through a space between the tungsten electrode 3 and the inner shield 11 and an outer shield gas 14 is supplied so as to flow through a space between the inner and outer shields 11 and 12. An electric voltage is applied to the tungsten electrode 3 through a current conducting portion 15. Through the application of the voltage, an arc for welding is generated between a portion of the tungsten electrode 3 positioned inside the narrow weld groove portion 2a and the members 1a, 1a to be welded to thereby form a molten pool, into which a welding wire is inserted, thus performing a TIG welding.

According to the welding method of the first embodiment, the double shield gas, i.e. inner and outer shield gases, is utilized as a shield gas, whereby the inner shield gas 13 is surely supplied to a front end portion of the tungsten electrode 3 inside the weld groove portion 2a, thereby preventing the tungsten electrode 3 from excessively consuming in the welding operation. In addition, the supply of the outer shield gas 14 can prevent oxygen in air from being involved to thereby prevent the oxidation of the molten pool.

Argon gas is generally used as a shield gas for the TIG welding, and in this first embodiment, argon gas containing hydrogen of 2 to 10 vol % or containing helium of 10 to 80 vol % will be preferably used. The use of such argon gas will be able to melt more deeply the members, base metal, 1a, 1a to be welded in comparison with the use of pure argon gas even if same welding heat amount is applied. That is, an arc energy is made higher by using a gas composed of argon gas and hydrogen or helium gas or their mixture gas, thus effectively performing the welding more deeply to the base metal. However, in a case of less than 2 vol % of hydrogen or 10 vol % of helium, the above effect will not be expected remarkably, and on the other hand, in a case of more than 10 vol % of hydrogen, there is a fear of explosion and in a case of more than 80 vol % of helium, the welding arc will not be effectively generated.

As the members to be welded, it is desirable to use stainless steel or nickel base alloy (inconel steel) plate having a thickness of 20 to 200 mm, a weld groove portion width of 5 to 15 mm and a weld groove portion depth of 20 to 100 mm. When the weld groove portion is formed on both the sides of a plate member to be welded, a plate member having a thickness of 200 mm will be utilized.

Furthermore, according to the welding method of this embodiment, even in an arrangement in which only the tungsten electrode 3 deeply extends into the weld groove portion 2a, substantially the same welding quality as that in a case where the electrode shortly extends thereinto can be effectively obtained, and the tungsten electrode 3 is less consumed. However, in the case of extending length of less than 20 mm, no advantageous effect is obtained in comparison with a conventional structure, and moreover, in the case of extending length of more than 100 mm, a good welding quality will not be expected and the tungsten electrode 3 is consumed. In view of these facts, according to the welding method of the present invention, the extending length of the tungsten electrode 3 into the weld groove portion 2a is decided to be between 20 to 100 mm. This is a length applicable substantially with no relation to the thickness of the metal plate to be welded.

In a preferred alternation, in a case where tungsten material containing thorium oxide (1 to 3 wt % $ThO_2$) or lanthanum oxide (1 to 3 wt % $La_2O_3$) is utilized for the tungsten electrode 3 in place of pure tungsten, the consumption of the electrode due to arc heat and oxidation will become less in comparison of the case of the pure tungsten, thus being advantageous.

Hereunder, a first embodiment of a TIG welding torch according to the present invention will be described with reference to FIGS. 2 and 3.

This TIG welding torch is preferably utilized for performing the TIG welding method of the above first embodiment, and like reference numerals are added to elements or portions corresponding to those shown in FIG. 1.

Figure 2:
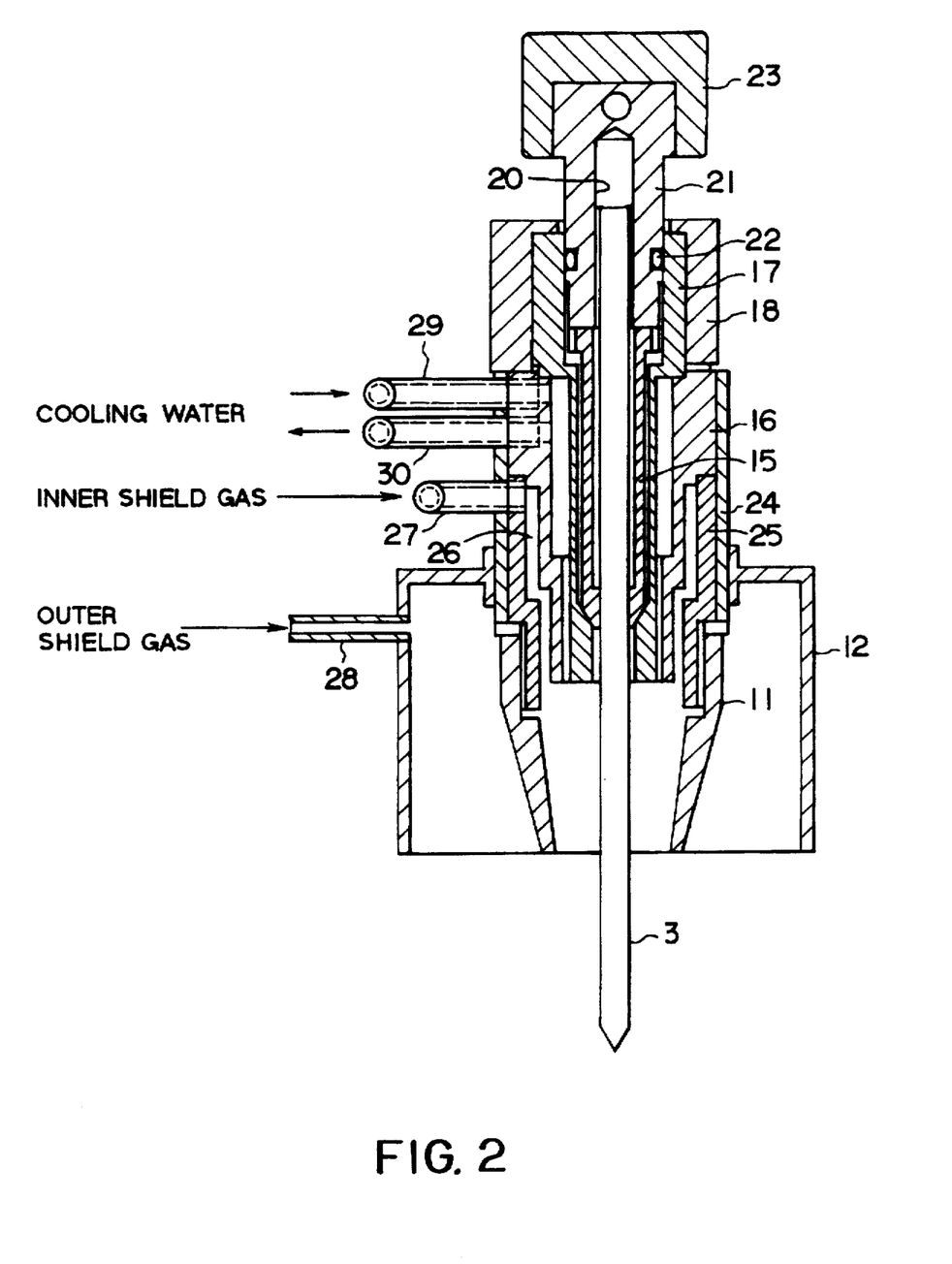
FIG. 2 is a first embodiment of a welding torch utilized for the first embodiment of the TIG welding method.

Referring to FIG. 2, reference numeral 16 denotes a collet holder, and the collet holder 16 has an upper portion into which a lower portion of a collet body 17 is screwed to fixedly mount the collet body 17 to the collet holder 16. An upper outer peripheral portion of the collet body 17 is covered by a torch cap 18.

Figures 3A, 3B:
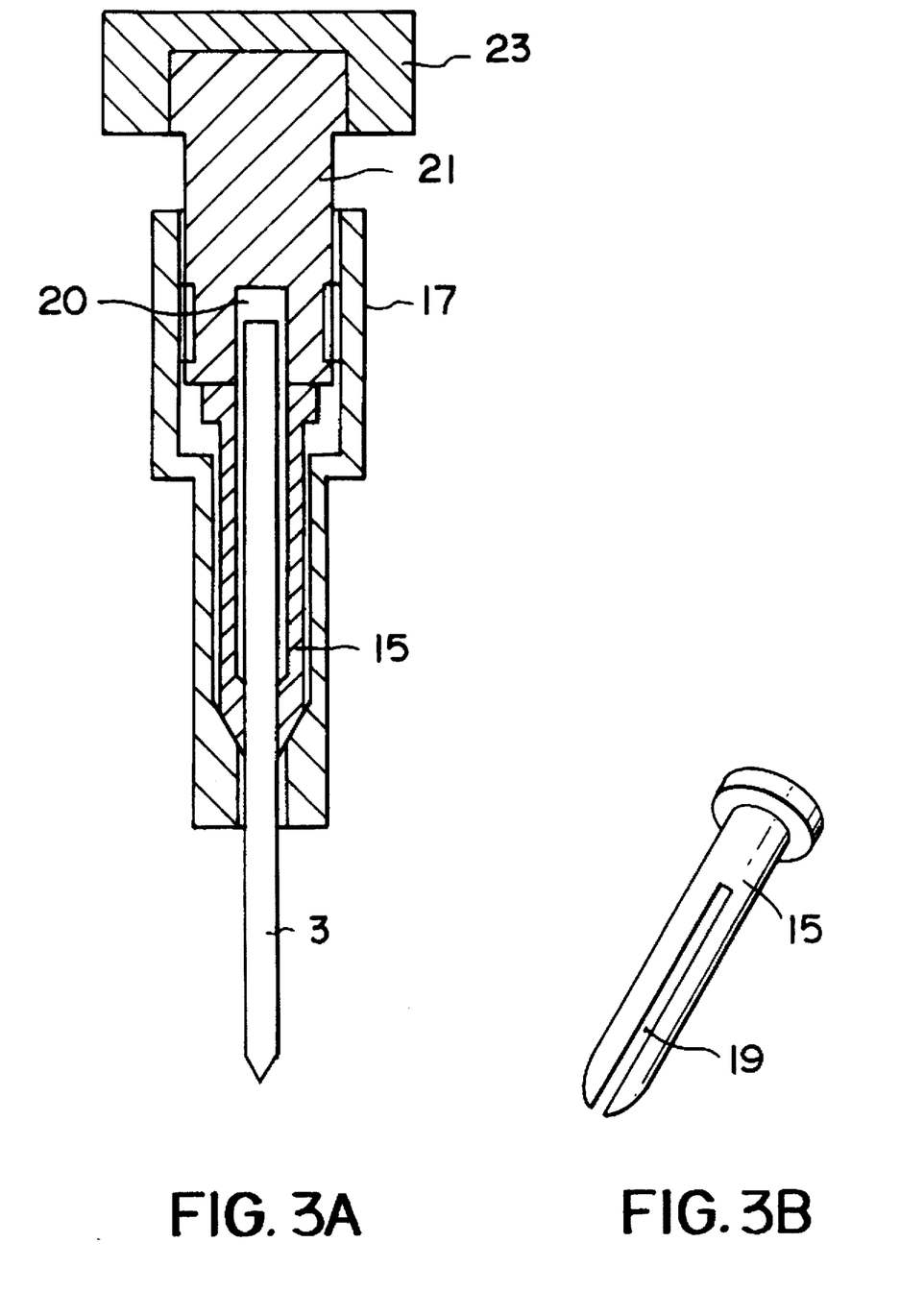
FIG. 3A is an elevational section of a portion surrounding a tungsten electrode used for the welding torch of FIG. 2.
FIG. 3B is a perspective view of a current conducting portion of the welding torch of FIG. 2.

The collet body 17 has an inner hollow structure in which a current conducting member 15 is inserted and mounted as shown in FIG. 3A, and as shown in FIG. 3B, the tungsten electrode 3 is formed with a slit 19, for the purpose of applying a resiliency thereto, extending in its axial direction. The tungsten electrode 3 is inserted into the current conducting member 15, and a handle screw bar 21 having an insertion hole 20 into which an upper end portion of the tungsten electrode 3 is inserted is screwed in the collet body 17.

As shown in FIG. 3, the inner lower portion of the collet body 17 and the lower portion of the current conducting member 15 are formed to provide tapered shapes, and accordingly, the current conducting member 15 is depressed, it Will be inwardly deformed by an amount corresponding to the width of the slit 19.

An O-ring 22 is disposed between the handle screw bar 21 and the collet body 17 to keep air-tight sealing therebetween. An upper portion of the handle screw bar 21 is coupled to a handle operating member 23, thus constituting a handle.

In a time when a handle is operated in a screw tightening direction, the length of the tungsten electrode to extend into the weld groove portion can be adjusted by holding the tungsten electrode 3 to an optional position. The current conducting member 15 is lowered, in a state shown in FIG. 2, i.e. used state, by screw tightening the handle, and then, is restricted by the collet body 17, whereby the front end portion of the current conducting member 15 is clamped because of the formation of the slit 19 to thereby tightly contact the tungsten electrode 3. Under the state, when a voltage is applied, a current flows from the current conducting member 15 to the tungsten electrode 3 through the collet body 17.

An outer shell 24 is disposed so as to surround the outer peripheral surface of the collet holder 15, and an inner shield holder 25 is mounted to an inner surface of the outer shell 24. The inner shield holder 25 has a lower portion to which an inner shield 11 is screwed fixedly, and an outer shield 12 is mounted to an outer surface of the outer shell 24.

The inner shield holder 25 and the collet holder 16 are arranged so that an inner gas flow passage 26 is formed between the inner shield holder 25 and the lower outer surface of the collet holder 16 and an inner shield gas supply tube 27 is connected to the outer shell 24 so as to communicate with the inner shield gas flow passage 26. An outer shield gas supply tube 28 is also connected to the outer shield 12, and a cooling water flow-in tube 29 and a cooling water flow-out tube 30 for circulating a cooling water in the collet holder 16 are connected to the collet holder 16 in a manner penetrating the outer shell 24.

According to the TIG welding torch of the described embodiment, it is not required to be provided with a specific structure, and hence, the TIG welding torch can be used without limiting the width of the weld groove portion.

Figure 4:
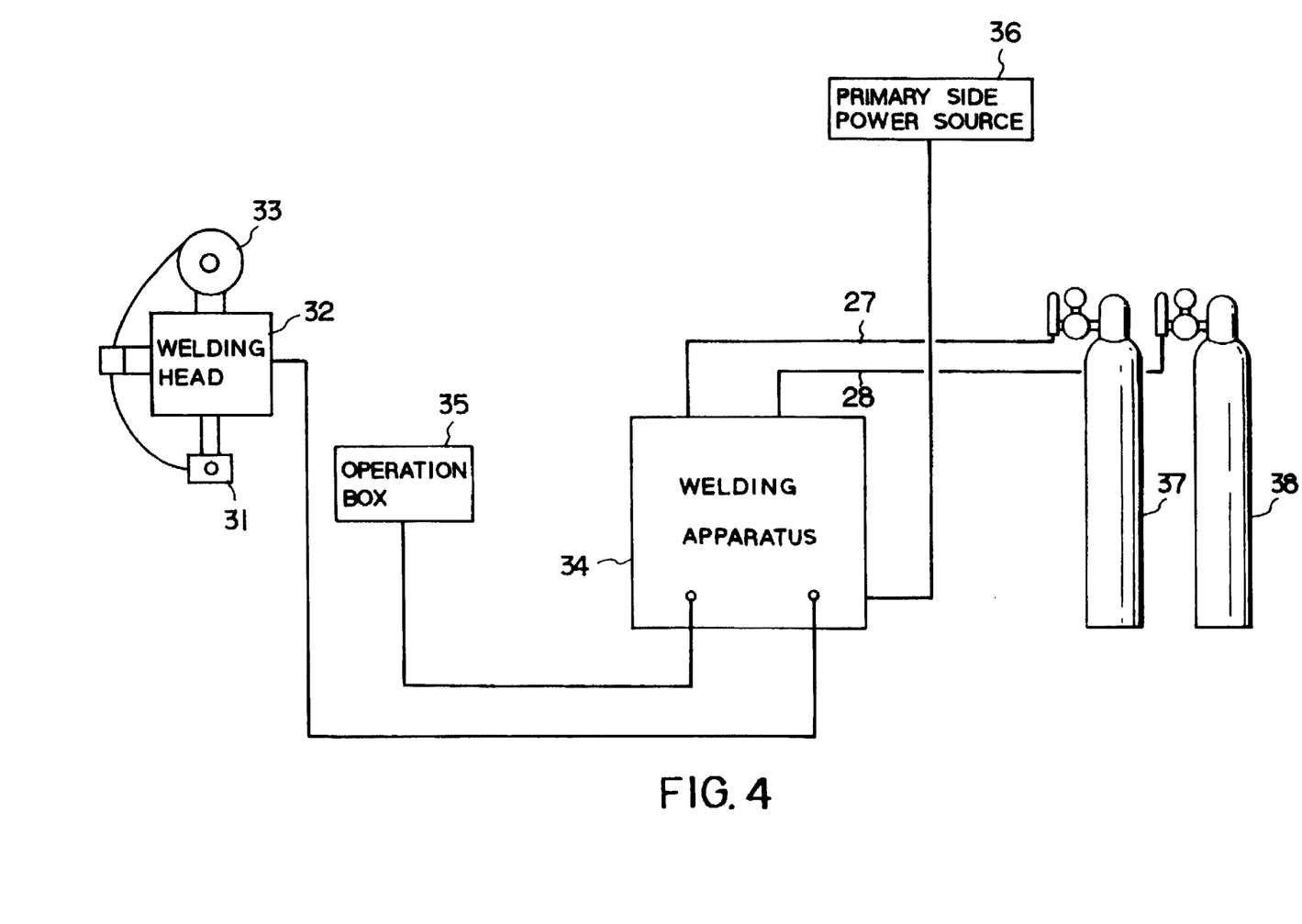
FIG. 4 is a schematic system diagram of a welding apparatus including the TIG welding torch of FIG. 2 and its associated members.

FIG. 4 shows an example of an arrangement in which the TIG welding torch of FIG. 2 is applied to a welding apparatus.

Referring to FIG. 4, the welding torch 31 is assembled with a welding head 32 through which a welding wire 33 is supplied to the welding torch 31. The welding head 32 is connected to the welding apparatus 34, to which an operation box 35 and a primary electric power source 36. An inner shield gas supply bomb 37 and an outer shield gas supply bomb 38 are also connected to the welding apparatus 34 through supply lines 27 and 28, respectively.

According to the welding system shown in FIG. 4, the welding process of the present invention will be carried out in the following manner.

(1) The tungsten electrode 3 is positioned so as to accord with the center of the weld groove portion of the members to be welded. Beforehand this process, the welding torch 31 is mounted to the welding head 32 and the primary side power source 36 is made "ON".

(2) A welding operation start switch provided for the operation box 35 is depressed to start the flowing of the inner and outer shield gases from the gas bombs 37 and 38.

(3) After a predetermined time has elapsed from the depression of the welding operation start switch, a welding arc is generated.

(4) When the welding arc is generated and the arc generating condition reaches a stable condition, that is, when the welding current reaches its initial current value, the welding wire 33 is inserted into the molten pool.

(5) The welding torch 31 is run.

(6) When the welding to the required portion has been completed, a welding operation stop switch provided for the operation box 34 is depressed to thereby gradually lower the welding current.

(7) At the same time of the depression of the welding operation stop switch, the operation of the welding wire is stopped.

(8) When the welding current is reduced, the running of the welding torch 31 is stopped to thereby complete the welding operation.

(9) The supply of the inner and outer shield gases from the inner and outer shield gas bombs 37 and 38 is stopped.

A second embodiment concerning a TIG welding method of the present invention will be described hereunder with reference to FIG. 5.

The welding method of this embodiment differs from that of the first embodiment described with reference to FIG. 1 in that a central shield gas 39 is further supplied through the tungsten electrode 3 and the current conducting member 15 in addition to the inner and outer shield gases to thereby effectively reduce the consumption of the tungsten electrode 3.

Figure 5:
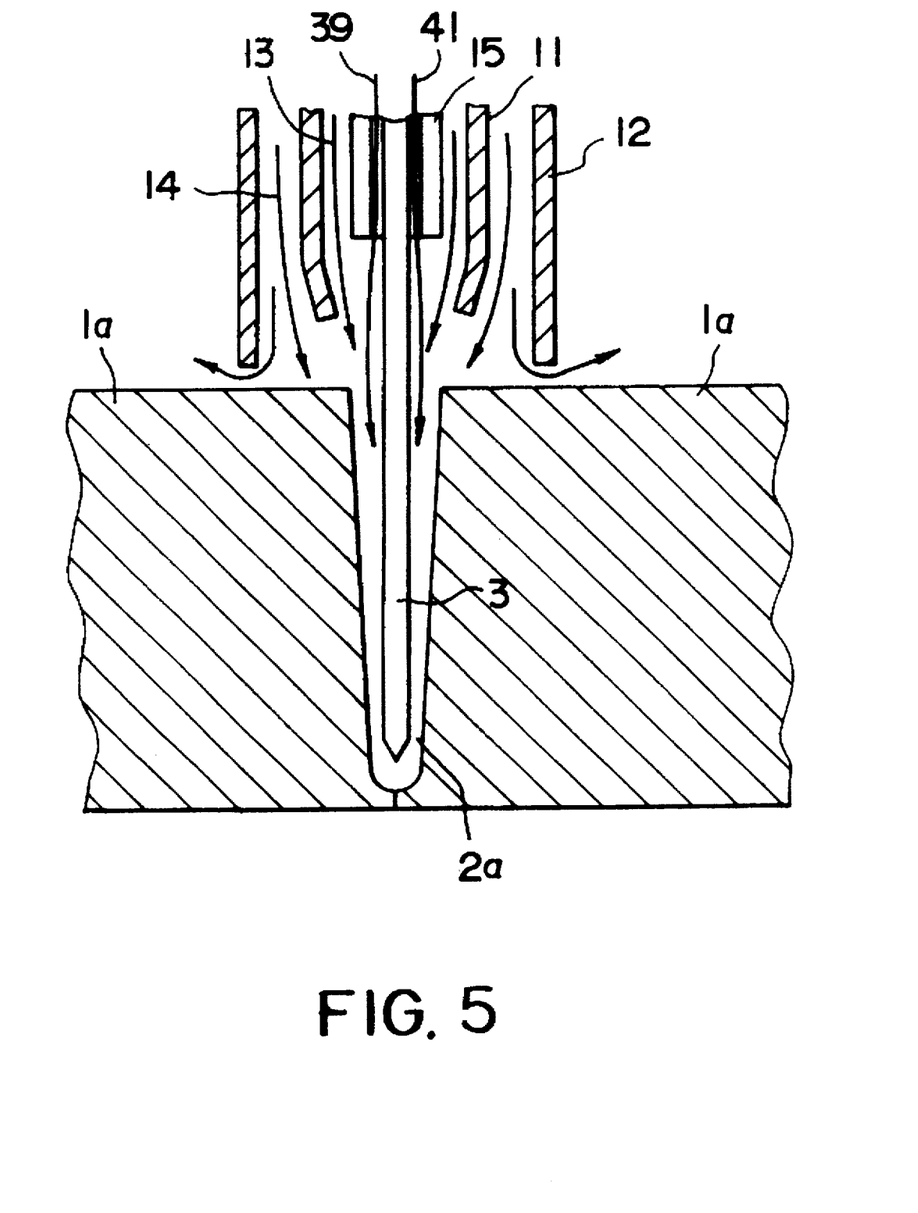
FIG. 5 is a schematic elevational section representing a second embodiment of a TIG welding method according to the present invention.

In FIG. 5, reference numeral 41 denotes a central shield gas flow passage through which the central shield gas 39 flows. According to the flowing of the central shield gas 39, the consumption of the tungsten electrode 31 can be further suppressed.

Figure 6A:
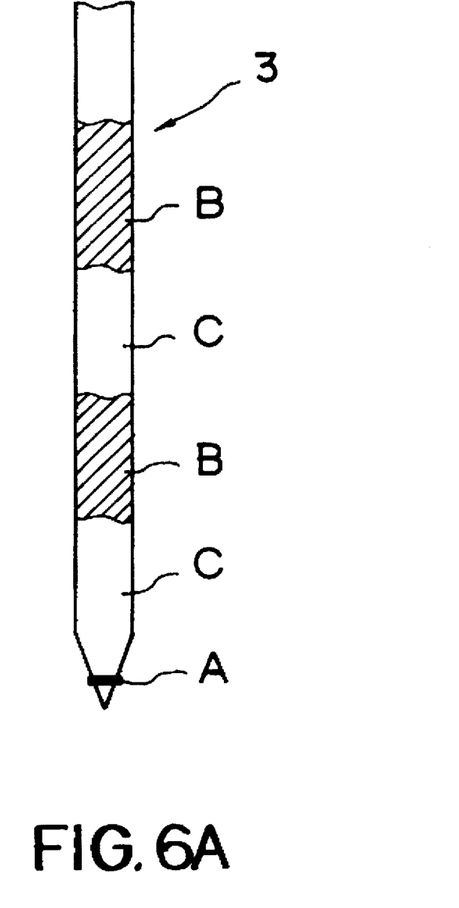
FIGS. 6A and 6B show conditions of tungsten electrode consumption in the case of the use of central shield gas and in the case of no use thereof.
Figure 6B:
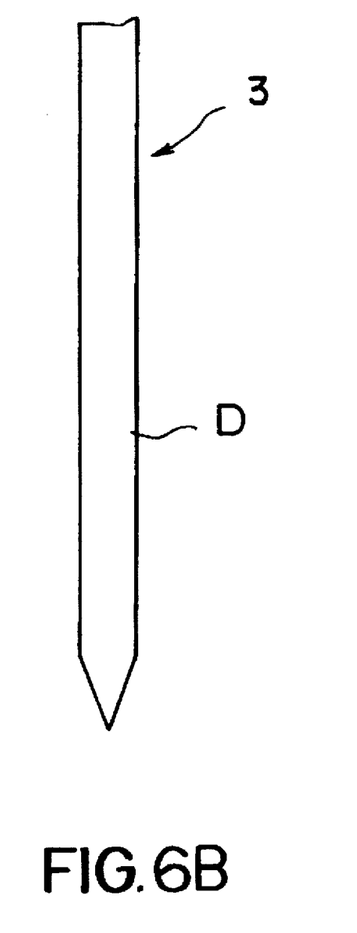

FIG. 6 shows conditions of the tungsten electrode consumption in the case of the use of the central shield gas (FIG. 6A) and the case of no use thereof (FIG. 6B), in which capital A shows a foreign material in shape of projection, B shows a heavily oxidized portion, C shows a lightly oxidized portion and D shows a non-oxidized portion.

As can be seen from the consumed conditions of the tungsten electrodes shown in FIGS. 6A and 6B, in the case where the central shield gas is not used, a foreign material in shape of projection adheres to the front end portion of the tungsten electrode 3, making worse the concentration of the welding arc and causing welding defect occurrence.

A second embodiment of a TIG welding torch according to the present invention, which is preferably applicable to the welding method represented by FIG. 5, will be described hereunder with reference to FIG. 7, in which like reference numerals are added to elements or portions corresponding to those shown in FIGS. 2 and 5.

The welding torch of this embodiment differs from that shown in FIG. 2 resides in that a central shield gas flow passage 41 is formed between the tungsten electrode 3 and the current conducting member 15 and a central shield 40 is connected to the lower portion of the collet body 17 to be detachably and disposed between the inner shield 11 and the collet body 17. The central shield 40 has a downward tapered shape and the shield gas flow passage is changed in cross sectional area by changing the central shield 40.

In a structure that the flow sectional area of the central shield gas flow passage 41 is made smaller than that of the inner shield gas flow passage, the flow velocity of the central shield gas becomes fast as shown in the following table 1, and the shielding effect for the tungsten electrode 3 can be improved, thus further suppressing the consumption of the tungsten electrode 3.

TABLE 1

(Central Shield Gas Flow Velocity/Inner Shield Gas Flow Velocity)

| | Central Shield Gas Flow Rate / Inner Shield Gas Flow Rate | | |
|---|---|---|---|
| Central Shield Gas Flow Passage Area / Inner Shield Gas Flow Passage Area | $\frac{1}{2}$ | $\frac{1}{3}$ | $\frac{1}{4}$ |
| 1/8 | 4 | 2.7 | 2 |
| 1/12 | 6 | 4 | 3 |

Figure 7:
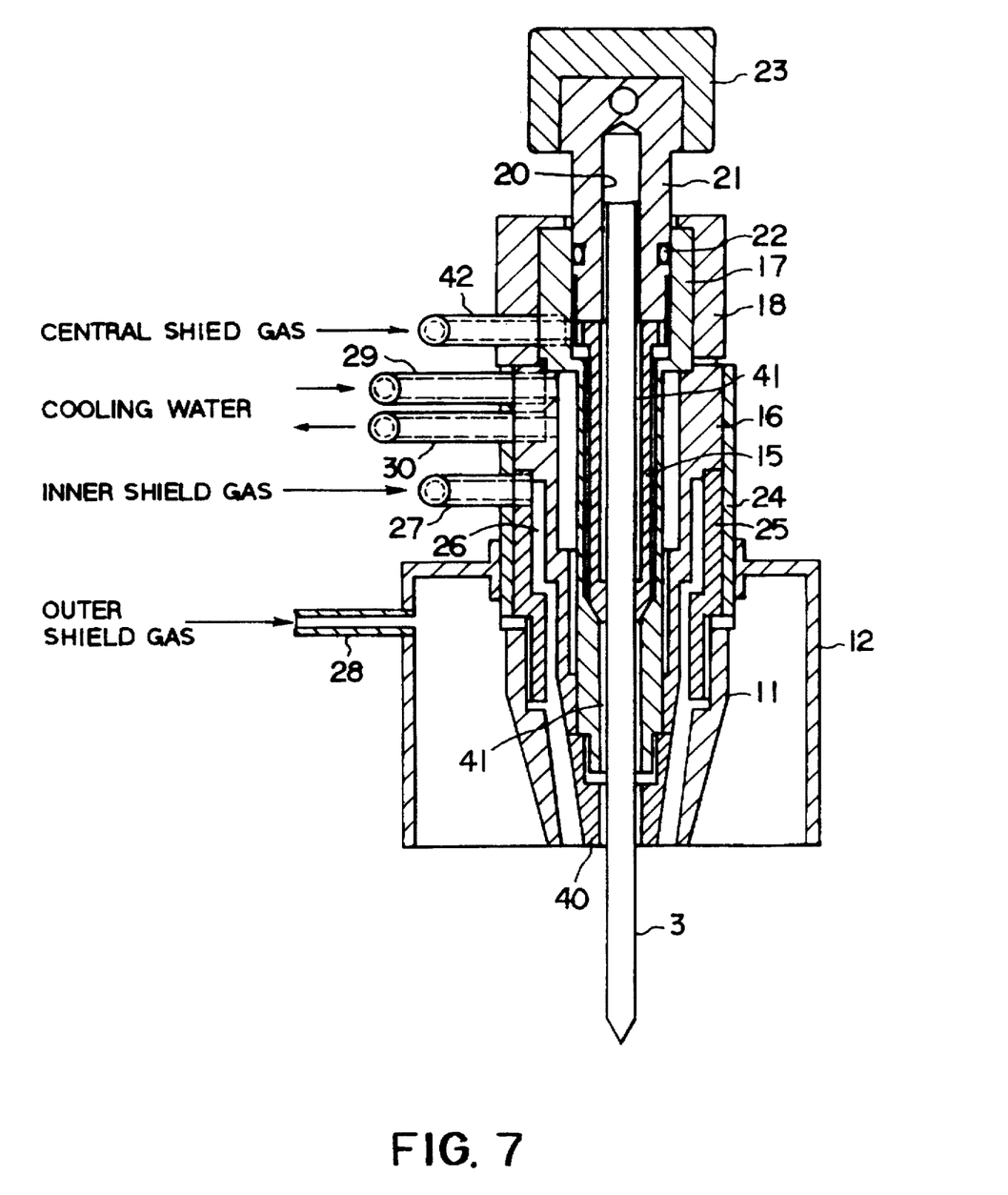
FIG. 7 is a second embodiment of a welding torch utilized for the second embodiment of the TIG welding method.

In FIG. 7, a central shield gas supply tube 42 is connected to the collet body 17 through a torch cap 18, and a collet body 17 is provided with a through hole through which the central shield Gas passes. This through hole is communicated with the central shield gas flow passage 41 formed between the tungsten electrode 3 and the current conducting member 15.

The welding process according to the second embodiment of the welding torch of the present invention will be carried out in the following manner, which basically corresponds to the process mentioned with reference to the first embodiment.

(1) The tungsten electrode 3 is positioned so as to accord with the center of the weld groove portion of the members to be welded.

(2) A welding operation start switch is depressed to start the flowing of the inner, outer and central shield gases from the gas sources.

(3) After a predetermined time has elapsed from the depression of the welding operation start switch, a welding arc is generated.

(4) When the welding arc is generated and the arc generating condition reaches a stable condition, that is, when the welding current reaches its initial current value, the welding wire is inserted into the molten pool.

(5) The welding torch 31 is run.

(6) When the welding to the required portion has been completed, a welding operation stop switch is depressed to thereby gradually lower the welding current.

(7) At the same time of the depression of the welding operation stop switch, the operation of the welding wire is stopped.

(8) When the welding current is reduced, the running of the welding torch 31 is stopped to thereby complete the welding operation.

(9) The supply of the inner, outer and central shield gases from the gas sources is stopped.

According to the TIG welding method of the present invention, more improved welding working can be achieved as described hereinbefore particularly with reduced consumption of the tungsten electrode, and this advantageous effect can be also achieved more effectively by utilizing the TIG welding torch of the present invention.

According to the present invention many advantageous effects and functions as summarized in the Summary of The Invention mentioned hereinbefore.

What is claimed is:

1. A TIG welding torch comprising:

a collet holder;

a collet body mounted in said collet holder;

a cylindrical current conducting member mounted in said collet body;

a tungsten electrode axially penetrating said cylindrical current conducting member;

an outer shell mounted to an outside surface of the collet holder;

an outer shield disposed outside the outer shell;

an inner shield holder disposed inside the outer shell;

an inner shield mounted to the inner shield holder, an end portion of an inner surface of the inner shield being tapered;

an outer shield gas supply means mounted to the outer shield;

an inner shield gas supply means for supplying an inner shield gas to a portion between the inner shield and the collet holder; and a cooling water supply means for passing a cooling water through a portion between the collet body and the collet holder.

2. The TIG welding torch according to claim 1, wherein said current conducting member is provided with a slit extending in an axial direction thereof.

3. A TIG welding torch according to claim 1, wherein said inner shield is formed with a throttle portion at a front end portion thereof.

4. A TIG welding torch according to claim 1, wherein said tungsten electrode is composed of a tungsten material containing thorium oxide or lanthanum oxide.

5. A TIG welding torch according to claim 1, wherein the front end of the tungsten electrode is inserted into the weld groove portion of the member to be welded by a length of about 20 to 100 mm.

6. A TIG welding torch according to claim 1, wherein said inner and outer shield gases are composed of an argon gas containing hydrogen gas of 2 to 10 vol % or containing helium gas of 10 to 80 vol %.

7. A TIG welding torch according to claim 1, further comprising a central shield gas passage formed between the tungsten electrode and the current conducting portion and a central shield disposed between the collet body and the inner shield.

8. A TIG welding torch according to claim 7, wherein said current conducting member is provided with a slit extending an axial direction thereof.

9. A TIG welding torch according to claim 7, wherein said inner shield is formed with a throttle portion at a front end portion thereof.

10. A TIG welding torch according to claim 7, wherein said tungsten electrode is composed of a tungsten material containing thorium oxide or lanthanum oxide.

11. A TIG welding torch according to claim 7, wherein the front end of the tungsten electrode is inserted into the weld groove portion of the member to be welded by a length of about 20 to 100 mm.

12. A TIG welding torch according to claim 7, wherein said inner, outer and central shield gases are composed of an argon gas containing hydrogen gas of 2 to 10 vol % or containing helium gas of 10 to 80 vol %.

13. A TIG welding method comprising the steps of:

inserting a tip of a tungsten electrode into a weld groove portion of a member to be welded;

applying voltage to the tungsten electrode to thereby generate an arc between the tungsten electrode and the member to be welded and forming a molten pool of the member, while directing an inner shield gas from a periphery of the tungsten electrode toward the tip and constricting the flow of the inner shield gas to produce a convergent flow toward the tip, and while directing an outer shield gas from outside of the inner shield gas towards the weld groove portion, to prevent the molten pool from being oxidized; and inserting a welding wire into the molten pool.

14. The TIG welding method according to claim 13, wherein said tungsten electrode is composed of a tungsten material containing thorium oxide or lanthanum oxide.

15. The TIG welding method according to claim 13, wherein the tip of the tungsten electrode is inserted into the weld groove portion of the member to be welded by a length of about 20 to 100 mm.

16. The TIG welding method according to claim 13, wherein said inner and outer shield gases are composed of an argon gas containing hydrogen gas of 2 to 10 vol % or containing helium gas of 10 to 80 vol %.

17. The TIG welding method according to claim 13, further including a step, performed during the applying step, of directing a central shield gas from a space between the tungsten electrode and a current conducting portion toward the tip.

18. The TIG welding method according to claim 17, wherein said tungsten electrode is composed of a tungsten material containing thorium oxide or lanthanum oxide.

19. The TIG welding method according to claim 17, wherein the tip of the tungsten electrode is inserted into the weld groove portion of the member to be welded by a length of about 20 to 100 mm.

20. The TIG welding method according to claim 17, wherein said inner, outer and central shield gases are composed of an argon gas containing hydrogen gas of 2 to 10 vol % or containing helium gas of 10 to 80 vol %.

21. A TIG welding method comprising the steps of:

inserting a tip of a tungsten electrode into a weld groove portion of a member to be welded;

applying voltage to the tungsten electrode to thereby generate an arc between the tungsten electrode and the member to be welded and forming a molten pool of the member, while directing an inner shield gas from a periphery of the tungsten electrode toward the tip, while directing an outer shield gas from outside of the inner shield gas towards the weld groove portion, to prevent the molten pool from being oxidized, and while directing a central shield gas from a space between the tungsten electrode and a current conducting portion toward the tip; and inserting a welding wire into the molten pool.

22. A TIG welding torch comprising:

a collet holder;

a collet body mounted in said collet holder;

a cylindrical current conducting member mounted in said collet body;

a tungsten electrode axially penetrating said cylindrical current conducting member;

an outer shell mounted to an outside surface of the collet holder;

an outer shield disposed outside the outer shell;

an inner shield holder disposed inside the outer shell;

an inner shield mounted to the inner shield holder;

an outer shield gas supply means mounted to the outer shield;

an inner shield gas supply means for supplying an inner shield gas to a portion between the inner shield and the collet holder;

a central shield gas passage formed between the tungsten electrode and the current conducting portion and a central shield disposed between the collet body and the inner shield; and a cooling water supply means for passing a cooling water through a portion between the collet body and the collet holder.

* * * * *